United States Patent
Chen et al.

(10) Patent No.: US 11,264,063 B2
(45) Date of Patent: Mar. 1, 2022

(54) MEMORY DEVICE HAVING SECURITY COMMAND DECODER AND SECURITY LOGIC CIRCUITRY PERFORMING ENCRYPTION/DECRYPTION COMMANDS FROM A REQUESTING HOST

(71) Applicant: MACRONIX INTERNATIONAL CO., LTD., Hsinchu (TW)

(72) Inventors: Chia-Jung Chen, Zhubei (TW); Chin-Hung Chang, Tainan (TW); Ken-Hui Chen, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 56 days.

(21) Appl. No.: 16/850,788

(22) Filed: Apr. 16, 2020

(65) Prior Publication Data

US 2021/0057002 A1 Feb. 25, 2021

Related U.S. Application Data

(60) Provisional application No. 62/889,581, filed on Aug. 21, 2019.

(51) Int. Cl.
*G11C 7/12* (2006.01)
*G11C 16/22* (2006.01)
(Continued)

(52) U.S. Cl.
CPC .......... *G11C 7/1039* (2013.01); *G11C 7/1051* (2013.01); *G11C 7/1078* (2013.01);
(Continued)

(58) Field of Classification Search
CPC ... G11C 7/1039; G11C 7/1051; G11C 7/1078; G11C 7/12
(Continued)

(56) References Cited

U.S. PATENT DOCUMENTS 6,957,329 B1 * 10/2005 Aleksic ............ G11B 20/00086
348/E7.056
7,392,399 B2 6/2008 Grohoski et al.
(Continued)

FOREIGN PATENT DOCUMENTS

JP 2001035171 A 2/2001
TW 526496 B 4/2003
(Continued)

OTHER PUBLICATIONS

Housley et al., "Using AES-CCM and AES-GCM Authenticated Encryption in the Cryptographic Message Syntax (CMS)," Internet Engineering Task Force IETF RFC 5084 (//tools.ietf.org/html/rfc5084), Nov. 2007, 11 pages.
(Continued)

*Primary Examiner* — Connie C Yoha
(74) *Attorney, Agent, or Firm* — Haynes Beffel & Wolfeld LLP

(57) ABSTRACT

A memory device, including a secure command decoder implementing security logic configured to detect commands carrying an encrypted immediate data payload from a requesting host, authenticate the host as source of the command, decode the immediate data and perform a memory access command called for by a command portion of the decrypted immediate data upon the storage cells of the memory device using the non-command portion of the decrypted immediate data, as well as to encrypt any result from executing the command portion prior to returning the result to the requesting host, and an input/output interface for I/O data units supporting multiple hosts.

20 Claims, 9 Drawing Sheets

(51) Int. Cl.
    *G11C 7/10*     (2006.01)
    *H04L 29/06*     (2006.01)
    *H04L 9/06*     (2006.01)
    *H04L 9/32*     (2006.01)

(52) U.S. Cl.
    CPC .............. *G11C 7/12* (2013.01); *H04L 9/0618* (2013.01); *H04L 9/3242* (2013.01); *H04L 63/045* (2013.01); *G11C 16/22* (2013.01)

(58) Field of Classification Search
    USPC .......................... 365/189.05, 185.04, 185.06
    See application file for complete search history.

(56) References Cited

U.S. PATENT DOCUMENTS

| | | | |
|---|---|---|---|
| 2004/0228481 A1 | 11/2004 | Crispin et al. | |
| 2007/0244819 A1* | 10/2007 | Goeke | H04N 21/25808 705/52 |
| 2020/0241768 A1* | 7/2020 | Chen | G06F 12/1408 |
| 2020/0372949 A1* | 11/2020 | Zhao | G11C 7/1042 |

FOREIGN PATENT DOCUMENTS

| | | |
|---|---|---|
| TW | 200504525 A | 2/2005 |
| TW | 200519738 A | 6/2005 |
| TW | 201837774 A | 10/2018 |

OTHER PUBLICATIONS

Krawczyk et al., "HMAC: Keyed-Hashing for Message Authentication," Internet Engineering Task Force IETF RFC 2104 (//tools.ietf.org/html/rfc2104), Feb. 1997, 11 pages.

NIST Special Publication 800-38D, Dworkin, "Recommendation for Block Cipher Modes of Operation: Galois/Counter Mode (GCM) and GMAC," Nov. 2007, 39 pages.

Rescorla, "Diffie-Hellman Key Agreement Method," Internet Engineering Task Force Ietf Rfc 2631 (//tools.ietf.org/html/rfc2631), Jun. 1999, 13 pages.

Salowey, et al. "AES Galois Counter Mode (GCM) Cipher Suites for TLS," Internet Engineering Task Force IETF RFC 5288 (//tools.ietf.org/html/rfc5288), Aug. 2008, 8 pages.

TW Office Action 11020888670 dated Sep. 10, 2021, 21 pages (with English Machine Translation).

* cited by examiner

MEMORY DEVICE HAVING SECURITY COMMAND DECODER AND SECURITY LOGIC CIRCUITRY PERFORMING ENCRYPTION/DECRYPTION COMMANDS FROM A REQUESTING HOST

PRIORITY APPLICATION

This application claims the benefit of U.S. Provisional Patent Application No. 62/889,581 filed 21 Aug. 2019, which application is incorporated herein by reference.

BACKGROUND

Field

The present invention relates to integrated circuit memory devices, such as flash devices, that support secure storage and retrieval, and particularly a secure command decoder to provide secure storage and retrieval from memory.

Description of Related Art

In modern information storage technology, many different types of memory architectures have been created, each provides storage of digital data and addresses different needs and requirements of a variety of applications. For example, flash, ReRAM, EPROM, PCM and so forth can be used to store digital data in various applications.

Digital data is easy to store and transmit; ease of access, however, makes security sensitive data stored as digital data easy to intercept and steal by the unauthorized party.

It is desirable to provide mechanisms for storing digital data that are more secure.

SUMMARY

A memory device includes a secure command decoder that implements security logic to detect commands carrying an encrypted immediate data payload from a requesting host, authenticate the host, decode the immediate data for authenticated hosts, and perform a memory access command called for by a command portion of the decrypted immediate data upon the storage cells of the memory device using the non-command portion of the decrypted immediate data. The command decoder can decode an unencrypted command as well. Some implementations also encrypt any result from executing the command portion prior to returning the result to the requesting host. An input/output interface for I/O data units supports transactions with multiple hosts. The input/output interface can comprise a serial interface (e.g. SPI), or a parallel interface. The technology described provides encryption of significant input parameters such as for example, a command code, addresses, byte counts, options, and so forth, thereby enabling devices implementing the described technology to protect sensitive information from being probed by unauthorized third parties. Further, technology described herein can provide authentication data back to the requesting host.

In a representative secure command mechanism implementation, a multiple step command decode process is used. In a first step, the command decoder receives a command from a host. The command decoder detects that the command received carries an immediate data "payload" that is encrypted. The immediate data can include a command or commands to perform operations that access the memory of the device, addresses, any significant input parameters, and data. In response to the host, the command decoder executes authenticated decryption to authenticate the message as originating with the host and to recover from the immediate data payload, a memory access command, addresses and significant input parameters and data whenever included. In a second step, the decrypted command is decoded and is executed using the addresses decrypted from the immediate data, as well as the decrypted input parameters, provided that authentication in the first step is successful.

One representative implementation includes circuitry to decode a novel command sequence. An example command decoder circuit receives a command sequence that includes a command code field and an intermediate data payload. The command decoder circuit decodes the command code field that includes an op code indicating one of (i) an unencrypted command, and (ii) a secured command in which the intermediate data payload includes an encrypted memory access command op code, an encrypted address field indicating a location or locations from which data is to be read, and one or more encrypted input variables including an encrypt result indicator. For example, the command decoder circuits encrypt data read from memory resulting from reading data when the op code indicates a secured command, the encrypted memory access command op code indicates a read from memory, and encrypt result indicator of the one or more encrypted input variables indicates encrypting the result.

Another representative implementation includes circuitry to decode a novel command sequence. An example command decoder circuit receives a command sequence that includes a command code field and an intermediate data payload. The command decoder circuit decodes the command code field that includes an op code indicating one of (i) an unencrypted command, and (ii) a secured command in which the intermediate data payload includes an encrypted memory access command op code, an encrypted address field indicating a location or locations to which data is to be written, encrypted data, and one or more encrypted input variables including an encrypt result indicator. For example, the command decoder circuits encrypt a return code resulting from writing data to memory when the op code indicates a secured command, the encrypted memory access command op code indicates a write to memory, and encrypt result indicator of the one or more encrypted input variables indicates encrypting the result.

In a representative implementation, a memory device comprises a memory array including a plurality of bit lines, an input/output interface for I/O data units, data path circuits connected between the memory array and the interface, and a command decoder circuit. The command decoder circuit receives secured and unsecured commands at the input/output interface. The decoder includes security logic circuitry that decrypts encrypted immediate data payload when a secured command op code is received, thereby obtaining decrypted information, and executes a memory operation corresponding with the decrypted information. Some implementations will also include security logic circuitry that authenticates whether the host is a recognized host in response to an input tag received with the secured command op code. Implementations of the command decoder are capable of decoding non-secure commands as well.

The technology disclosed is applicable to all types of memory having command interfaces. Example embodiments are described in which a memory array comprises a flash, however, the technologies described herein can be applied to other types of memory devices as well. Some embodiments implement security command decoder mechanism in a NOR flash memory. Other embodiments implement security command decoder mechanism in a NAND flash memory. Still other embodiments implement security command decoder mechanism in a memory that is not a flash memory.

Other aspects and advantages of our technology can be seen on review of the drawings, the detailed description and the claims, which follow.

DETAILED DESCRIPTION

A detailed description of embodiments of the present invention is provided with reference to the FIGS. 1A, 1B, 2, 3, 4, 5, 6, 7, and 8.

Figure 1A:
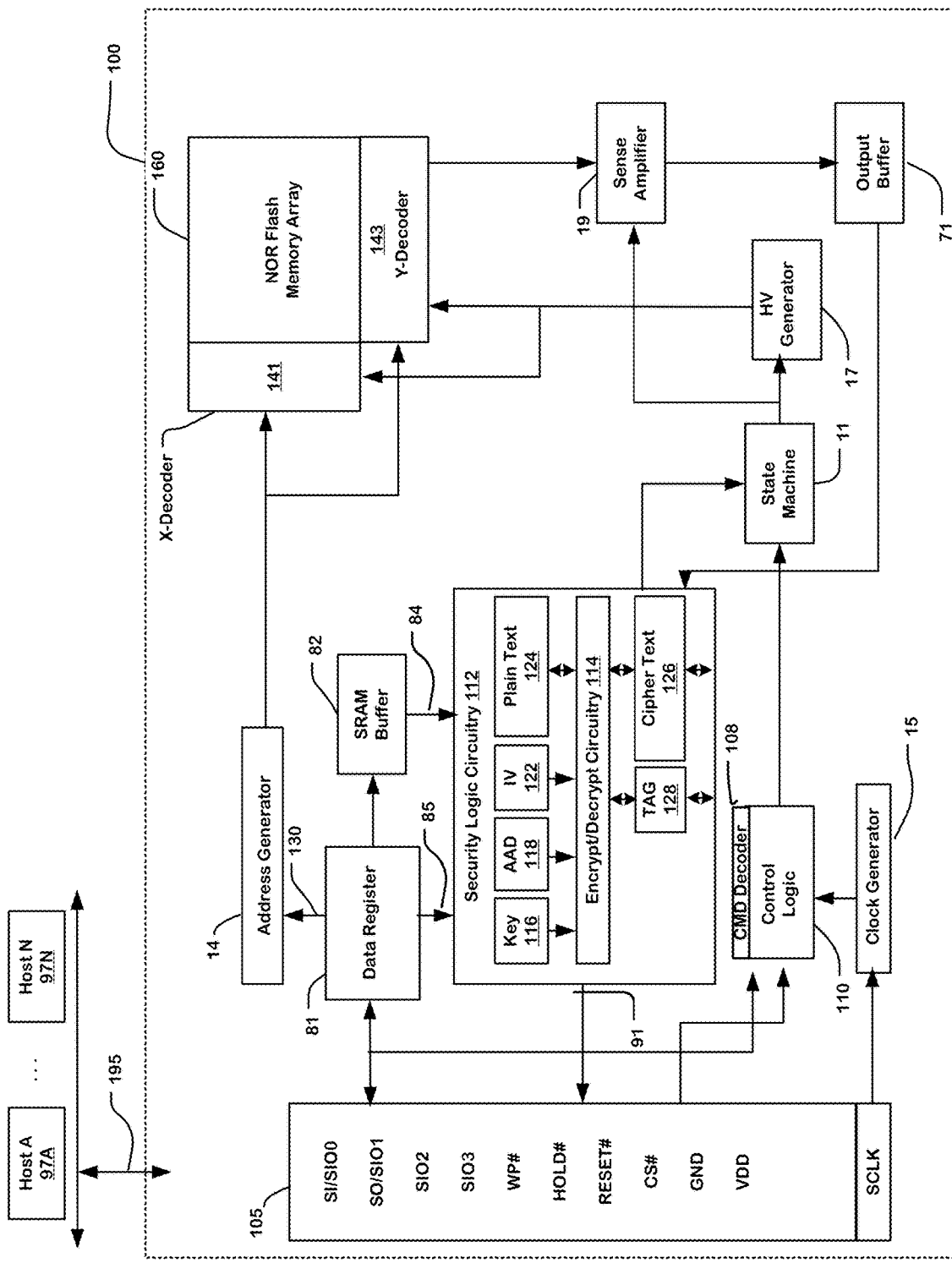
FIG. 1A is a simplified block diagram of an integrated circuit memory device having a security command decoder mechanism according to an embodiment.
Figure 1B:
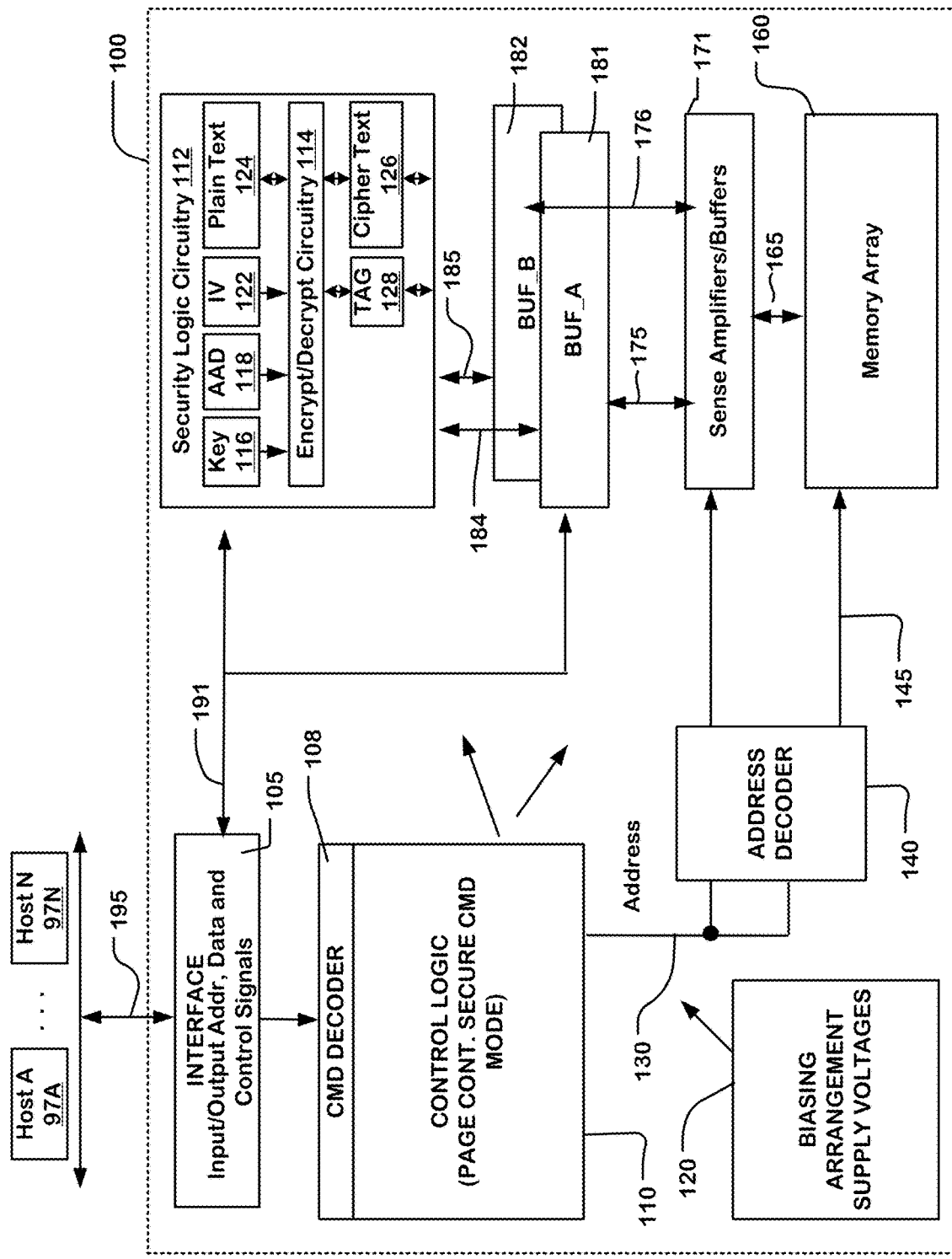
FIG. 1B is a simplified block diagram of an integrated circuit memory device having a security command decoder mechanism according to another embodiment.

FIG. 1A and FIG. 1B, collectively referred to as FIG. 1, are simplified block diagrams of embodiments of an integrated circuit memory device having a security command decoder mechanism. The integrated circuit memory device 100 includes a memory array 160 including multiple-level cells MLC that store two or more bits of data per cell, on an integrated circuit substrate. The memory array 160 can be a flash memory implemented using two-dimensional or three-dimensional array technology. One implementation of memory array 160 stores data in unencrypted (plain text) format, but will provide the data in encrypted (cipher text) form in accordance with the technology disclosed. Alternative implementations of memory array 160 store data in encrypted (cipher text) form. Memory devices as described herein can be implemented using multichip modules, stacked chips and other configurations as well. The memory device can be implemented on a single integrated circuit chip, on a multichip module that includes one or more integrated circuits in a common package, or on a plurality of chips configured to suit a particular need.

Control logic 110 and security logic circuitry 112 with a command decoder 108, on the integrated circuit memory device 100 includes logic, such as a state machine, responsive to received commands to execute secure memory access operations as described herein. Security logic circuitry 112 performs decryption of secured commands detected by control logic 110, authentication of hosts 97A-97N issuing secured commands, and encryption of data resulting from executing the decrypted secured commands against memory array 160. The control logic 110 outputs control signals, represented by arrows on the diagram, and addresses on bus 130. The addresses applied on bus 130 can include for example outputs of an address counter (not shown in FIG. 1 for clarity sake) in the address generator 14 and/or control logic 110, or addresses carried in the immediate data payload decrypted from secured commands received from authenticated hosts.

Security logic circuitry 112 includes encryption/decryption circuitry 114 that implements one or more encryption algorithms that can be realized using an IP core, programmable logic and processor, circuitry or combinations thereof. Some examples of encryption algorithms include without limitation, Authenticated Encryption Standard (AES) in Galois/Counter Mode (GCM) mode (i.e., AES-GCM), Authenticated Encryption Standard with Counter in Cipher Block Chaining Message Authentication Code (CBC-MAC) mode (i.e., AES-CCM) or the like. For background information about AES-GCM and AES-CCM, reference may be had to NIST Special Publication 800-38D, entitled "Recommendation for Block Cipher Modes of Operation: Galois/Counter Mode (GCM) and GMAC" (//nvlpubs.nist.gov/nistpubs/Legacy/SP/nistspecialpublication800-38d.pdf), Internet Engineering Task Force IETF RFC 5288 (//tools.ietf.org/html/rfc5288) and Internet Engineering Task Force IETF RFC 5084 (//tools.ietf org/html/rfc5084), respectively; the entirety of which are incorporated herein by reference for all purposes. Block ciphers implementing AES, such as Galois Counter Mode (GCM), perform encryption and decryption operations on fixed length strings of bits. The length of this bit string is called a "block size" and a size of 128 bits (16 bytes) is used in implementations. Example encryption and decryption implementations of the disclosed technology, however, can support block and key sizes of 128, 192, and 256 bits.

Key management circuitry 116 generates and stores keys to be used in conducting secured memory operations with hosts 97A-97N. While described using examples employing symmetric keys, the disclosed technology does not require symmetric keys and implementations using public key arrangements are within the scope of our work. Keys can be provided to hosts 97A-97N using Diffie-Hellman Key Exchange, pre-installed by manufacturer, locally generated from random number generator, combinations of these, and other key exchange protocols. For background information about one particular variant of Diffie-Hellman Key Exchange, reference can be had to Internet Engineering Task Force IETF RFC 2631 (//tools.ietforg/html/rfc2631); the entirety of which are incorporated herein by reference for all purposes.

In the illustrated embodiments, a set of parameter registers is included in the memory device 100 and coupled to control logic 110 and security logic circuitry 112. The parameter registers in the set can store parameters input, and output, for a plurality of cryptographic and security related program operations, which are selectable according to the processes described herein. For example, the parameter registers can store keys 116, additional authentication data

118, initialization vectors 122, and input tag(s) 92 as well as output tag(s) 98 used to provide authenticated secure communications with an authenticated party. Also, the parameter registers can store details of key generations and pairings, block such as pulse height, pulse width, and pulse magnitude increments, used in cryptographic algorithms such as incremental stepped pulse programming ISPP algorithms.

Plaintext buffer 124 stores plain text that comprises (i) output data from a decryption process conducted on a security command ciphertext as input, or (ii) input data from a result of a decrypted operation being performed on memory array 160. Plaintext buffer 124 is sized to accommodate blocks of input plaintext to be encrypted or output of decrypted plaintext in blocks of data in accordance with a size of an amount of data that can be encrypted or decrypted by encryption/decryption circuitry 114. In embodiments implementing Galois Counter Mode (GCM), it is defined for block ciphers with a block size of 128 bits (16 bytes).

Additional authentication data 118 (AAD) includes input parameters, identifier, counter value and any other fields indicating how plaintext input is to be processed. For example, within a network protocol, the AAD might include addresses, ports, sequence numbers, protocol version numbers, and other fields that indicate how the plaintext should be treated. In another example, the AAD can include input data to the authenticated encryption function that is authenticated but not encrypted. Further description of the use of AAD for authenticating the host as the source of the message is provided below with reference to FIG. 5, FIG. 7. For further details, reference may be had to NIST Special Publication 800-38D, entitled "Recommendation for Block Cipher Modes of Operation: Galois/Counter Mode (GCM) and GMAC" (//nvlpubs.nist.gov/nistpubs/Legacy/SP/nist-specialpublication800-38d.pdf); the entirety of which is incorporated herein by reference for all purposes.

Initialization vector circuit 122 generates an initialization vector (IV) or starting variable (SV) that comprises a fixed-size input to a cryptographic algorithm that is random or pseudorandom. The IV is essentially a nonce, i.e, a value that is unique within the specified context, which determines an invocation of the authenticated encryption function on the input data to be protected.

Ciphertext buffer 126 stores cipher text that comprises (i) input encrypted data to a decryption process conducted on a security command, or (ii) output encrypted data from a result of an encryption operation being performed on a result of an operation being performed on memory array 160. Ciphertext buffer 126 is sized to accommodate blocks of input ciphertext to be decrypted or output of encrypted ciphertext in blocks of data in accordance with a size of an amount of data that can be encrypted or decrypted by encryption/decryption circuitry 114. In embodiments implementing Galois Counter Mode (GCM), it is defined for block ciphers with a block size of 128 bits (16 bytes).

Output Tag(s) 98 can be authentication tags generated by encryption/decryption circuitry 114 in embodiments implementing Galois Counter Mode (GCM) and can be added to the ciphertext. In embodiments employing hash-based message authentication code (HMAC) Tag 98 is a specific type of authentication code created using a cryptographic hash function and key 116, appended to plaintext messages and checked by recipients in order to verify message integrity. Tag generation in an example embodiment implementing Galois Counter Mode (GCM) is described with reference to FIG. 5 and FIG. 7 below. Hash-based message authentication code (HMAC) in an example embodiment includes computing equation (1):

$$HMAC(K,m)=H((k' \text{ XOR opad})||H(k' \text{ XOR ipad})||m)) \quad (1)$$

wherein H is a cryptographic hash function, m is the message to be authenticated, K is the secret key, K' is a block-sized key derived from the secret key, K; either by padding to the right with 0s up to the block size, or by hashing down to less than the block size first and then padding to the right with zeros, double bars indicate concatenation, opad is the block-sized outer padding, comprising of repeated bytes valued 0x5c, and ipad is the block-sized inner padding, comprising of repeated bytes valued 0x36. For further details, reference may be had to Internet Engineering Task Force IETF RFC 2104 (//tools.ietforg/html/rfc2104); the entirety of which are incorporated herein by reference for all purposes.

FIG. 1A is a simplified block diagram of an integrated circuit memory device having a security command decoder mechanism according to an embodiment. This diagram is merely an example, which should not unduly limit the scope of the claims herein. One of ordinary skill in the art would recognize other variations, modifications, and alternatives. As shown, integrated circuit device 100 includes several input blocks coupled to respective input/output pins. In one embodiment, the interface 105 is a serial interface including a set of I/O ports 195 through which commands, addresses and data are communicated. The serial interface can be based on or compliant with a Serial Peripheral Interface (SPI) bus specification in which the command channel shares the I/O pins used by address and data. For example, the integrated circuit memory device 100 can include input/output ports using pins for receiving and transmitting SPI bus signals. One pin can be connected to an input data line carrying serial input data/address signal SI, usable for commands as well. Another pin, or multiple other pins, can be connected to an output data line or output data lines carrying serial output data signal SO. Another pin can be connected to a clock line carrying serial clock signal SCLK that is coupled to Clock Generator 15, which in turn is coupled to command decoder 108 and control logic 110. Control logic 110 is operably coupled to receive a chip select signal CS# on a CS# input terminal of interface 105. Commands or instructions may be input through input SI/SIO0 block, for example, and then transferred to data register 81 and control logic 110. Control logic 110, in combination with state machine 11, interprets and executes the command such as a read, erase, or program operation. In an embodiment, control logic 110 also receives a signal from WP#/ACC block of interface 105 to perform a write protect function, and a signal from HOLD# block of interface 105 to keep a clock signal from entering the state machine 11.

Data may be input through SI/SIO0 block, SO/SIO1 block, WP#/ACC block, and HOLD# block, which are coupled to data register 81. Data register 81 is coupled to SRAM buffer 82 for temporary storage during decryption operations by security logic 112. Security logic circuitry 112 is coupled to the SRAM buffer 82 and data register 81 by data bus 84 and data bus 85. The data buses 84 and 85 can have a bus width less than an block size, such as one byte or one word, and are used by the security logic circuitry 112 to cycle through plain text and cipher text stored in blocks to retrieve data from one buffer, perform encryption/decryption operations, and store results in the other buffer. The security logic circuitry 112 can also, or alternatively, be coupled by data bus 91 to the interface 105 for movement of data back and forth as necessary.

Data may be output through SI/SIO0 block, SO/SIO1 block, WP#/ACC block, and HOLD# block, which are coupled the output buffer 71. In some implementations, output buffer 71 can store additional spare bits including associated tag codes. One page can include a plurality of blocks, wherein blocks include a segment of data that can be encrypted or decrypted by security logic circuitry 112. In embodiments implementing Galois Counter Mode (GCM), it is defined for block ciphers with a block size of 128 bits.

An address corresponding to a location in memory array 160 may be supplied from data register 81 to address generator 14. The address is then decoded by X-decoder 141 and Y-decoder 143. In some implementations, a page buffer (not shown in FIG. 1A for clarity sake) can be coupled to memory array 160 to provide temporary storage for memory operations. In a read operation, the data is transferred from memory array 160 through sense amplifier 19 to the output buffer 71. For write operation, data is transferred from data register 81, buffered in SRAM buffer 82 for decryption, and then written into memory array 160. For high voltage operation, e.g., for a write operation, high voltage generator 17 is activated . . . . Other types of interfaces, including parallel interfaces can be used as well. The I/O ports 195 on a particular integrated circuit memory device 100 can be configured to provide output data with an I/O data width, which can be, for some examples, 1, 4, 8, 16, 32 or more bits in parallel per interface clock (e.g. SCLK) cycle. The I/O interface 105 can include a FIFO buffer, a shift register buffer or other supporting circuits along with a transmitter for transmitting data received at the interface on ports at a port clock rate, such as an SCLK rate for an SPI interface.

FIG. 1B is a simplified block diagram of an integrated circuit memory device having a security command decoder mechanism according to another embodiment. This diagram is merely an example, which should not unduly limit the scope of the claims herein. One of ordinary skill in the art would recognize other variations, modifications, and alternatives. As shown, integrated circuit device 100 includes a decoder 140 is coupled to a plurality of word lines 145, and arranged along rows in the memory array 160, and to Sense Amplifiers/Buffers 171. Sense Amplifiers/Buffers 171 can be coupled to a plurality of bit lines 165 arranged along columns in the memory array 160 for reading data from and writing data to the memory array 160. In other examples, an input/output port may be used in which addresses and data may be provided on shared lines in an address/data bus. Also, serial interfaces may be deployed.

The Sense Amplifiers/Buffers 171 can include one or more storage elements for each bit line. The address decoder 140 can select and couple specific memory cells in the memory array 160 via respective connecting bit lines to the Sense Amplifiers/Buffers 171. The Sense Amplifiers/Buffers 171 can store data that is written to or read from these specific memory cells in parallel. The Sense Amplifiers/Buffers 171 can have a page width for pages including thousands of bits, such as 2K bits or 4K bits, or more. In some implementations, Sense Amplifiers/Buffers 171 can store additional spare bits including associated tag codes. One page can include a plurality of blocks, wherein blocks include a segment of data that can be encrypted or decrypted by security logic circuitry 112. In embodiments implementing Galois Counter Mode (GCM), it is defined for block ciphers with a block size of 128 bits.

A buffer memory structure in this embodiment includes a second buffer level, including two parts designated buffer buf_A 181 and buffer buf_B 182, in this example, where each part of the second buffer level can store a part, such as one half, of the contents of the output buffer, where the part of the contents of the output buffer preferably includes one or more unencrypted plain text data portions. Also, each part of the second buffer level can be read from and written to independently. In some embodiments, the buffers buf_A, buf_B can be implemented using dual port or multi-port memory technology, allowing independent reads and writes to different addresses, or can be implemented using multiple banks of memory, having separate address decoding and read-out circuits. Other embodiments can include three-level buffer structures including the Sense Amplifiers/Buffers 171 and two additional buffer levels. Also, other arrangements of buffer memory structures in the data path circuits between the output buffer and the interface can be implemented.

The Sense Amplifiers/Buffers 171 can be coupled with the memory array 160 via a plurality 165 of data lines. In some implementations, data lines 165 includes at least a page (plus ECC codes when included) in width. Sense Amplifiers/Buffers 171 can be coupled with the buffers 181, 182 (BUF_A, BUF_B) of the buffer structure, via buses 175, 176. In some implementations, the buses 175, 176 can have a width equal to a half width of the Sense Amplifiers/Buffers 171. The second-level buffers BUF_A, BUF_B can each be implemented with a cache memory using SRAM (static random access memory) memory structures, for example, that has a one row by multiple column architecture. For instance, a page can include 2048 bits+spare bits including ECC codes, and BUF_A can have one row with 1024 (+spare bits including ECC codes) columns or a width of 1024+spare bits including ECC codes.

Security logic circuitry 112 is coupled to the buffer memory structure (181, 182) by data bus 184 and data bus 185. The data buses 184 and 185 can have a bus width less than an block size, such as one byte or one word, and are used by the security logic circuitry 112 to cycle through plain text and cipher text stored in buf_A and buf_B in blocks to retrieve data from one buffer, perform encryption/decryption operations, and store results in the opposite buffer. The security logic circuitry 112 can also, or alternatively, be coupled by data bus 191 to the buffer memory structure (181, 182) for movement of data back and forth as necessary.

An I/O interface 105 which can include a byte-wide or multiple byte-wide transmit register or FIFO that is coupled to the security logic circuitry 112 and to a buffer memory structure (181, 182) by data bus 191.

Input/output data and control signals are moved among the interface 105, the command decoder 108 and the control logic 110, and input/output ports 195 on the integrated circuit memory device 100 or other data sources internal or external to the integrated circuit memory device 100. In some embodiments, the ports 195 can connect to on-chip host circuits, such as a general purpose processor or special purpose application circuitry, or a combination of modules providing system-on-a-chip functionality supported by the memory array 160.

In the example shown in FIG. 1, control logic 110 using a bias arrangement state machine controls the application of a bias arrangement supply voltage generated or provided through the voltage supply or supplies in block 120, such as read, program and erase voltages including page read to transfer data from a page in the memory array to the output buffer. The control logic 110 is coupled to the multi-level buffer structure comprised of buf_A 181, buf_B 182 and Sense Amplifiers/Buffers 171, the security logic circuitry 112, and the memory array 160.

The control logic 110 and command decoder 108 constitute a controller which can be implemented using special purpose logic circuitry including state machines and supporting logic. In alternative embodiments, the control logic comprises a general-purpose processor, which can be implemented on the same integrated circuit, which executes a computer program to control the operations of the device. In yet other embodiments, a combination of special-purpose logic circuitry and a general purpose processor can be utilized for implementation of the control logic.

The command decoder 108 and control logic 110 of the controller are configured to detect and execute encrypted commands against a storage memory. In embodiments described herein, the controller is responsive to the commands received at the input/output interface, to control memory operations including detecting and executing encrypted commands to conduct storage and retrieval of information against a storage memory and output results in encrypted form at the I/O interface.

The memory array 160 can comprise floating gate memory cells or dielectric charge trapping memory cells configured to store multiple bits per cell, by the establishment of multiple program levels that correspond to amounts of charge stored, which in turn establish memory cell threshold voltages VT. The description herein is based on the use of charge trapping memory cells, such as floating gate flash memory and dielectric charge trapping flash memory. The technology can be used with other memory cell technologies. In other examples, the memory cells may comprise programmable resistance memory cells, configured for multiple bits per cell, by the establishment of multiple program levels that correspond to amounts of resistance.

In implementations, the hosts 97A-97N can comprise a general purpose processor, a special purpose processor, a processor configured as a memory controller, or other processor that uses the memory device 100. All or part of the hosts 97A-97N can be implemented on the same integrated circuit as the memory. Although the above has been shown using a selected group of components for the integrated circuit device, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

Figure 2:
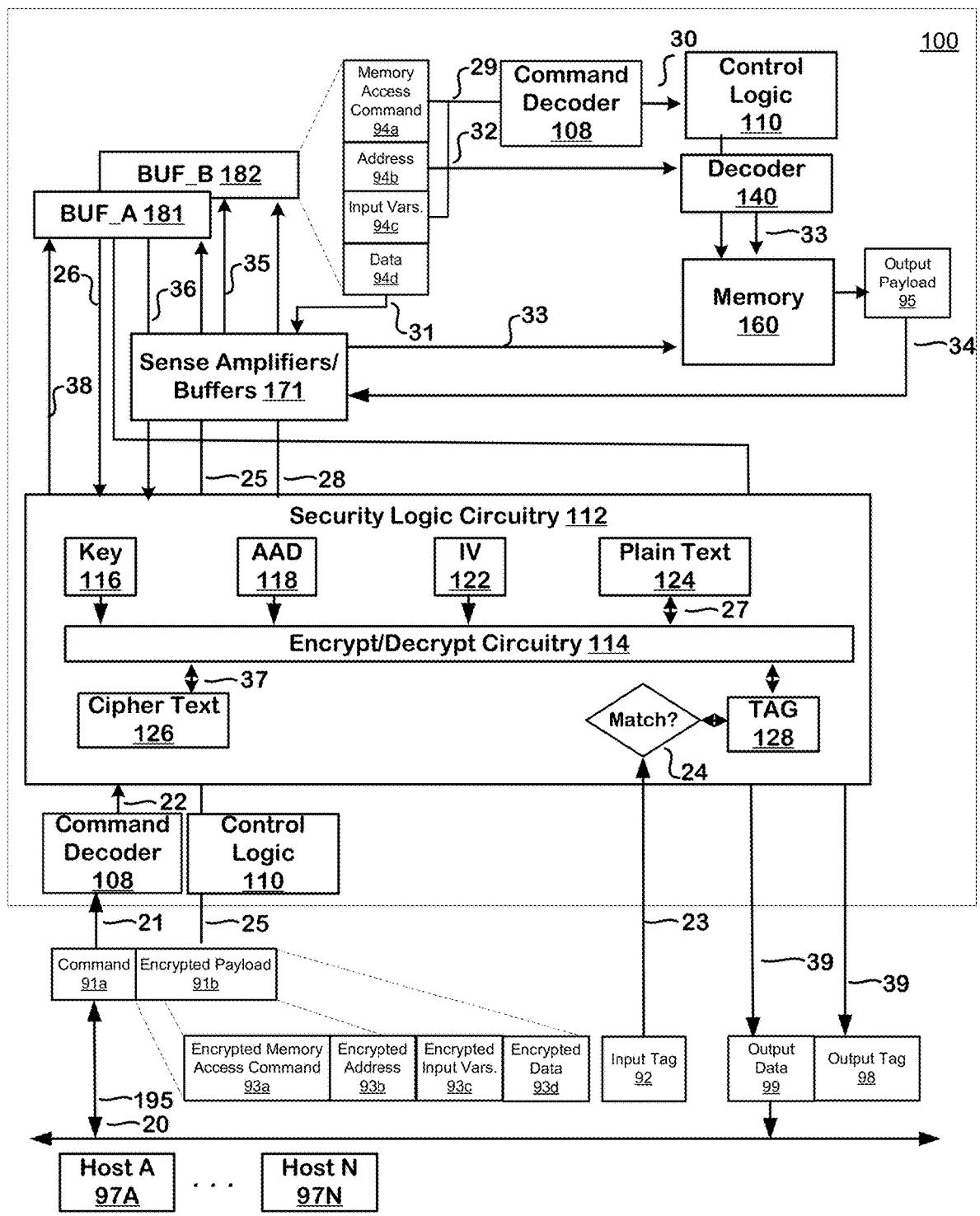
FIG. 2 is a dataflow diagram illustrating a write operation for an embodiment of an integrated circuit memory device having a security command decoder mechanism like that of FIGS. 1A and 1B.
Figure 3:
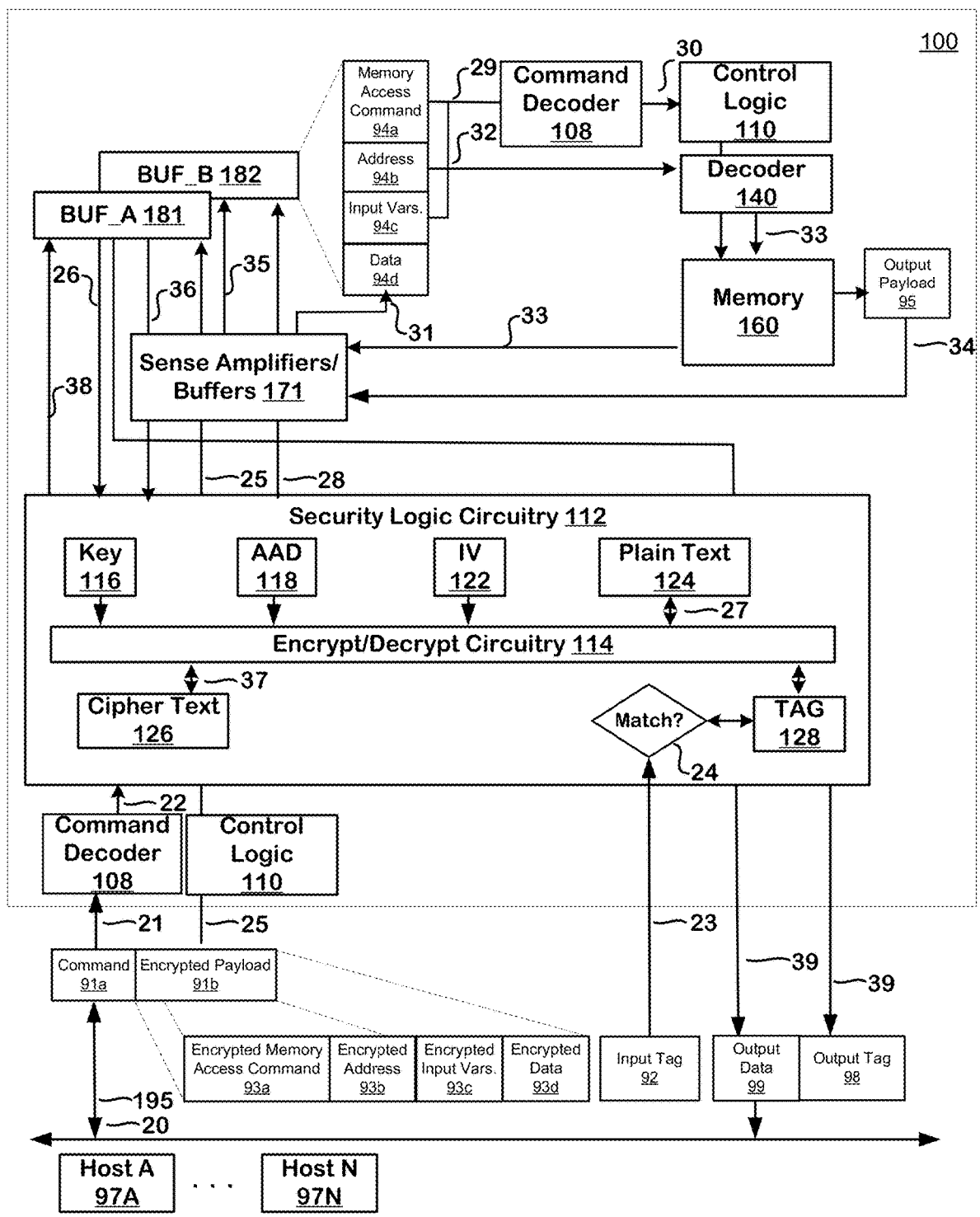
FIG. 3 is a dataflow diagram illustrating a read operation for an embodiment of an integrated circuit memory device having a security command decoder mechanism like that of FIGS. 1A and 1B.
Figure 4:
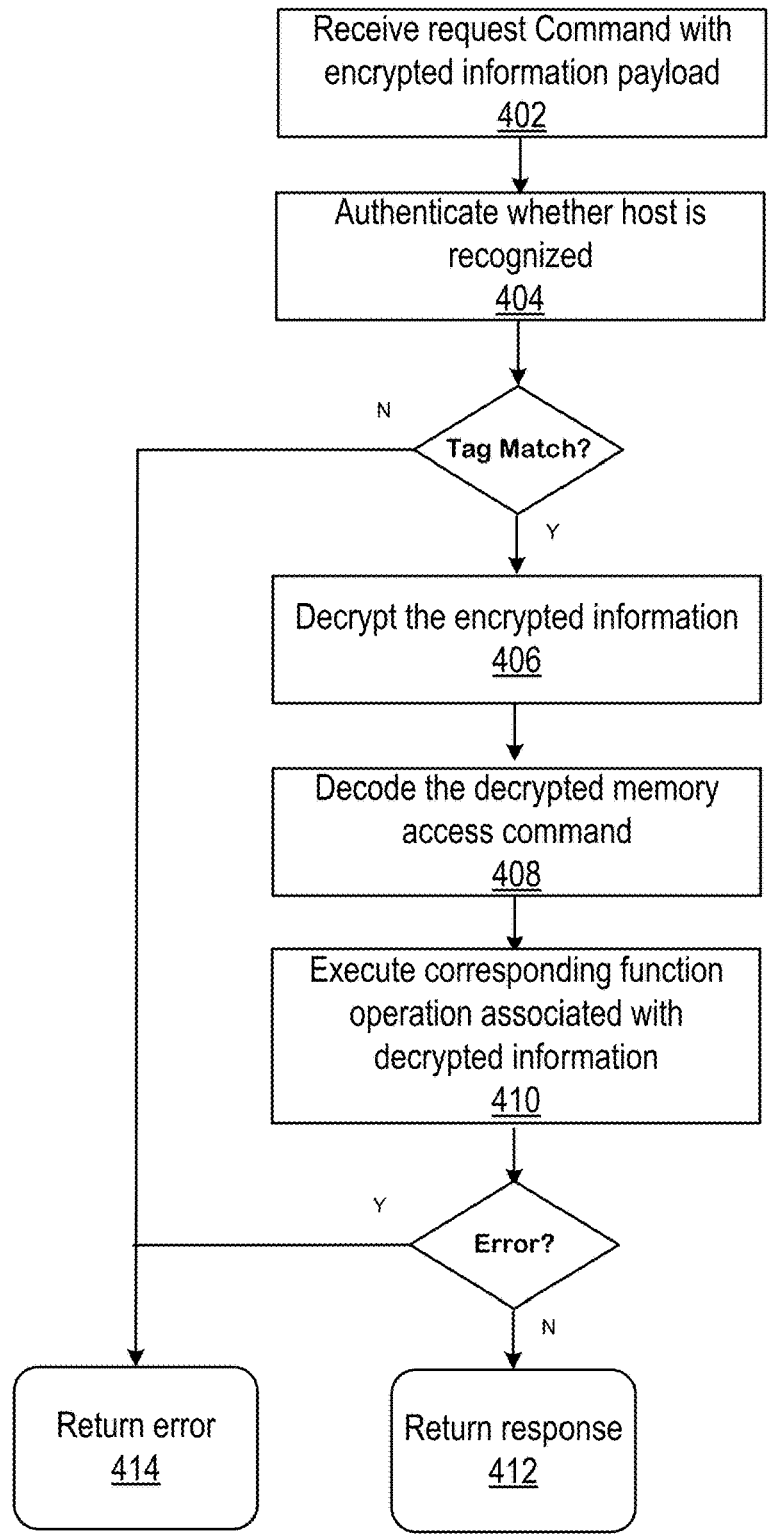
FIG. 4 is a flowchart illustrating an operation mode of a security command decoder as described herein for a system like that of FIGS. 1A and 1B.

Having described an example security architecture for a storage memory, next examples of write and read operations conducted using security mechanisms like that of FIG. 1 will be described with reference to dataflow diagrams of FIG. 2 and FIG. 3, and flowchart of FIG. 4. FIG. 2 is a dataflow diagram illustrating a write operation for an embodiment of an integrated circuit memory device having a security command decoder mechanism like that of FIG. 1 and FIG. 4 is a flowchart illustrating an operation mode of a security command decoder as described herein for a system like that of FIG. 1.

Secure Write Operations

Now with reference to dataflow diagram 200 of FIG. 2 and flowchart 400 of FIG. 4, an example of a secure command with an encrypted write command will be described. FIG. 2 is a dataflow diagram illustrating a write operation for an embodiment of an integrated circuit memory device having a security command decoder mechanism like that of FIG. 1. In block 402 of FIG. 4 and flow 20 of FIG. 2, host A 97A has sent a secure command 91a and encrypted payload 91b and an input tag 92 to the memory device 100 via port 195. In flow 21, I/O interface 105 (not shown in FIG. 2 for simplicity and clarity sake) sends command 91a to command decoder 108. In flow 22, command decoder 108 recognizes command 91a as a secure command carrying encrypted information and triggers security logic circuitry 112 to perform authenticated decryption of the encrypted information of the secure command 91a.

Secure command 91a includes immediate data comprising an encrypted payload 91b and may also include specific un-encrypted parameters, such as one or more options for secure command 91a. Implementations differ and content and configuration of encrypted payload 91b will differ accordingly according to command type, design goals, and specific hardware and/or firmware implementations. Accordingly, the configuration of encrypted payload 91b illustrated by FIG. 2 is exemplary, rather than limiting. Notwithstanding, exemplary encrypted payload 91b comprises an encrypted memory access command 93a, encrypted address information 93b, encrypted input variables 93c and encrypted data 93d. Encrypted data 93d comprises data to be written to storage in memory 100 for whenever encrypted memory access command 93a is a write command. Encrypted input variables 93c can include byte counts, options, and the like.

In block 404 of FIG. 4 the memory device 100 authenticates whether the host A 97A is recognized. In flow 23, input tag 92 from host A 97A is routed by I/O interface 105 (not shown in FIG. 2 for clarity sake) to security logic circuitry 112. In flow 24, tag checking circuitry 128 determines whether the input tag 92 authenticates the sender as host A 97A. Tag checking circuitry 128 can implement Galois Counter Mode (GCM), hash-based message authentication code (HMAC), or other alternative algorithms to authenticate the input tag 92. In the event that tag checking circuitry 128 cannot authenticate the sender using the input tag 92, a return code is returned in block 414 and no further action is taken on the command 91a.

In block 406 of FIG. 4, the memory device 100 decrypts encrypted information of command 91a. In flow 25, I/O interface 105 (not shown in FIG. 2 for clarity sake) sends encrypted payload 91b of command 91a to buf_A 181. In flow 26, data of the encrypted payload stored in buf_A 181 are moved to ciphertext buffer 126 of security logic circuitry 112 in blocks having a block size appropriate to the algorithm(s) implemented by encryption/decryption circuitry 114. In an example embodiment implementing Galois Counter Mode (GCM), it is defined for block ciphers with a block size of 128 bits. In flow 27, encryption/decryption circuitry 114 decrypts the contents of ciphertext buffer 126 and writes the result into plain text buffer 124. In flow 28, blocks of decrypted information read from plain text buffer 124 are written to buf_B 182 as decrypted content. As illustrated by FIG. 2, decrypted content of buf_B 182 can comprise a memory access command 94a, address 94b, input variables 94c and data 94d.

In block 408 of FIG. 4, the decrypted memory access command 94a is decoded. In flow 29, memory access command 94a is routed to command decoder 108. The command decoder 108 recognizes memory access command 94a as a write command to write data 94d to address 94b in memory 160 using input variables 94c.

In block 410 of FIG. 4, the memory command is executed by the memory device. In flow 30, command decoder 108 triggers control logic 110 to execute the write command to write data 94d to address 94b in memory 160 using input variables 94c. In flow 31, control logic 110 triggers moving write data 94d to Sense Amplifiers/Buffers 171 in preparation for writing the data to memory array 160. In flow 32, control logic 110 triggers providing address 94b to address decoder 140. In flow 33, control logic 110 triggers writing data 94d to locations of memory array 160 activated by address decoder 140. In flow 34, output payload 95, comprising return codes or other types of responses resulting from conducting the write command are stored in Sense Amplifiers/Buffers 171. If this operation is successful, a successful return code can be returned as an output in encrypted or un-encrypted format in block 412; otherwise an error code can be returned as an output in encrypted or un-encrypted format in block 414 of FIG. 4. In flow 35, output payload 95 is moved to buf_B 182. In flow 36, output payload is copied in block size portions if needed to plaintext buffer 124 of security logic circuitry 112. In flow 37 encryption/decryption circuitry 114 creates a tag 98 using the contents of the plaintext buffer 124 using for example, the method described herein below with reference to FIG. 4, FIG. 6 and FIG. 7. In implementations where the output is to be encrypted, the encryption/decryption circuitry 114 will in addition, or in some implementations in parallel, encrypt the contents of plaintext buffer 124 and store the result into ciphertext buffer 126. In flow 38, blocks of encrypted output payload 95 from ciphertext buffer 126 are assembled into buf_A. In a flow 39, the contents of buf_A, output data 99 are provided to the invoking host A 97A in either encrypted or decrypted form, as appropriate to the memory access command 94a, along with the tag 98 generated by the encryption/decryption circuitry 114 in flow 39.

Secure Read Operations

Having described an example of a write operation conducted using security mechanisms like that of FIG. 1, next a read operation conducted using like security mechanisms will be described with reference to dataflow diagram of FIG. 3 and flowchart of FIG. 4. FIG. 3 is a dataflow diagram illustrating a read operation for an embodiment of an integrated circuit memory device having a security command decoder mechanism like that of FIG. 1 and FIG. 4 is a flowchart illustrating an operation mode of a security command decoder as described herein for a system like that of FIG. 1.

Now with reference to dataflow diagram 300 of FIG. 3 and renewed reference to flowchart 400 of FIG. 4, an example of a secure command with an encrypted read command will be described. FIG. 3 is a dataflow diagram illustrating a read operation for an embodiment of an integrated circuit memory device having a security command decoder mechanism like that of FIG. 1. In block 402 of FIG. 4 and flow 20 of FIG. 3, host A 97A has sent a secure command 91a and encrypted payload 91b and an input tag 92 to the memory device 100 via port 195. In flow 21, I/O interface 105 (not shown in FIG. 3 for clarity sake) sends command 91a to command decoder 108. In flow 22, command decoder 108 recognizes command 91a as a secure command carrying encrypted information and triggers security logic circuitry 112 to perform authenticated decryption of the encrypted information of the secure command 91a.

Secure command 91a includes immediate data comprising an encrypted payload 91b. Implementations differ and content and configuration of encrypted payload 91b will differ accordingly according to command type, design goals, and specific hardware and/or firmware implementations. Accordingly, the configuration of encrypted payload 91b illustrated by FIG. 3 is exemplary, rather than limiting. Notwithstanding, exemplary encrypted payload 91b comprises an encrypted memory access command 93a, encrypted address information 93b, encrypted input variables 93c and encrypted data 93d. Encrypted data 93d is used for write operations and may contain no data during read operations. Optionally, encrypted data 93d comprises control information, and/or an address identifying a buffer location to which data read from storage in memory 100 can be written for whenever encrypted memory access command 93a is a read command. Data read from storage memory 100 is sent to the host A 97A making the request in encrypted format or optionally in plaintext format. Encrypted input variables 93c can include byte counts, options, and the like.

In block 404 of FIG. 4 the memory device 100 authenticates whether the host A 97A is recognized. In flow 23, input tag 92 from host A 97A is routed by I/O interface 105 (not shown in FIG. 3 for clarity sake) to security logic circuitry 112. In flow 24, tag checking circuitry 128 determines whether the input tag 92 authenticates the sender as host A 97A. Tag checking circuitry 128 can implement Galois Counter Mode (GCM), hash-based message authentication code (HMAC), or other alternative algorithms to authenticate the input tag 92. In the event that tag checking circuitry 128 cannot authenticate the sender using the input tag 92, a return code is returned in block 414 and no further action is taken on the command 91a.

In block 406 of FIG. 4, the memory device 100 decrypts encrypted information of command 91a. In flow 25, I/O interface 105 (not shown in FIG. 2 for simplicity sake) sends encrypted payload 91b of command 91a to buf_A 181. In flow 26, data of the encrypted payload stored in buf_A 181 are moved to ciphertext buffer 126 of security logic circuitry 112 in blocks having a block size appropriate to the algorithm(s) implemented by encryption/decryption circuitry 114. In an example embodiment implementing Galois Counter Mode (GCM), it is defined for block ciphers with a block size of 128 bits. In flow 27, encryption/decryption circuitry 114 decrypts the contents of ciphertext buffer 126 and writes the result into plain text buffer 124. In flow 28, blocks of decrypted information read from plain text buffer 124 are written to buf_B 182 as decrypted content. As illustrated by FIG. 3, decrypted content of buf_B 182 can comprise a memory access command 94a, address 94b, input variables 94c and data 94d.

In block 408 of FIG. 4, the decrypted memory access command 94a is decoded. In flow 29, memory access command 94a is routed to command decoder 108. The command decoder 108 recognizes memory access command 94a as a read command to read data from address 94b in memory 160 using input variables 94c.

In block 410 of FIG. 4, the memory command is executed by the memory device. In flow 30, command decoder 108 triggers control logic 110 to execute the read command to read data from address 94b in memory 160 using input variables 94c. In flow 32, control logic 110 triggers providing address 94b to address decoder 140. In flow 33, control logic 110 triggers reading data 94d from locations of memory array 160 activated by address decoder 140 into Sense Amplifiers/Buffers 171. In flow 34, output payload 95, comprising return codes or other types of responses resulting from conducting the read command are stored in Sense Amplifiers/Buffers 171. If the read operation is successful, a successful return code can be returned as an output in encrypted or un-encrypted format in block 412; otherwise an error code can be returned as an output in encrypted or un-encrypted format in block 414 of FIG. 4. In flow 31, control logic 110 triggers moving read data 94d, the data read from memory array 160, from Sense Amplifiers/Buffers 171 to buf_B 182. In flow 35, output payload 95 is moved to buf_B 182. In flow 36, read data 94d and output payload are copied in block size portions if needed to plaintext buffer 124 of security logic circuitry 112. In flow 37 encryption/ decryption circuitry 114 creates a tag 98 using the contents of the plaintext buffer 124 using for example, the method described herein below with reference to FIG. 4, FIG. 6 and FIG. 7. In implementations where the output is to be encrypted, the encryption/decryption circuitry 114 will in addition, or in some implementations in parallel, encrypt the contents of plaintext buffer 124 and store the result into ciphertext buffer 126. In flow 38, blocks of encrypted read data 94d and output payload 95 from ciphertext buffer 126 are assembled into buf_A. In a flow 39, the contents of buf_A, output data 99 are provided to the invoking host A 97A in either encrypted or decrypted form, as appropriate to the memory access command 94a, along with the tag 98 generated by the encryption/decryption circuitry 114 in flow 39.

Having described an example of a read operation conducted using security mechanisms like that of FIG. 1, next an example authenticated encryption service that implements Galois Counter Mode encryption used in some encryption/decryption circuitry 114 embodiments will be described with reference to data flow diagram 500 of FIG. 5 and flowchart 600 of FIG. 6.

Figure 5:
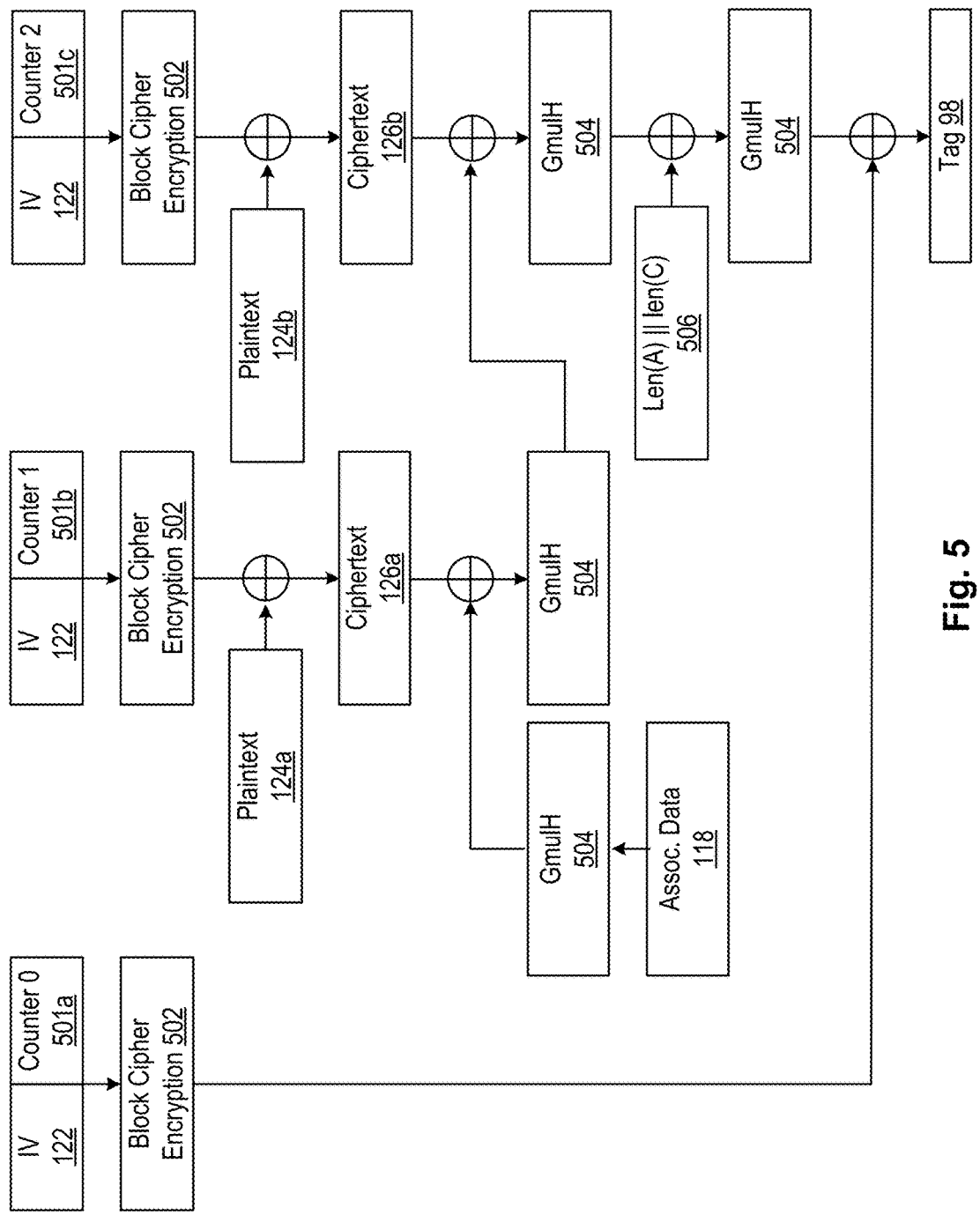
FIG. 5 is a dataflow diagram illustrating a block cipher counter mode of a security command decoder as described herein for a system like that of FIGS. 1A and 1B.
Figure 6:
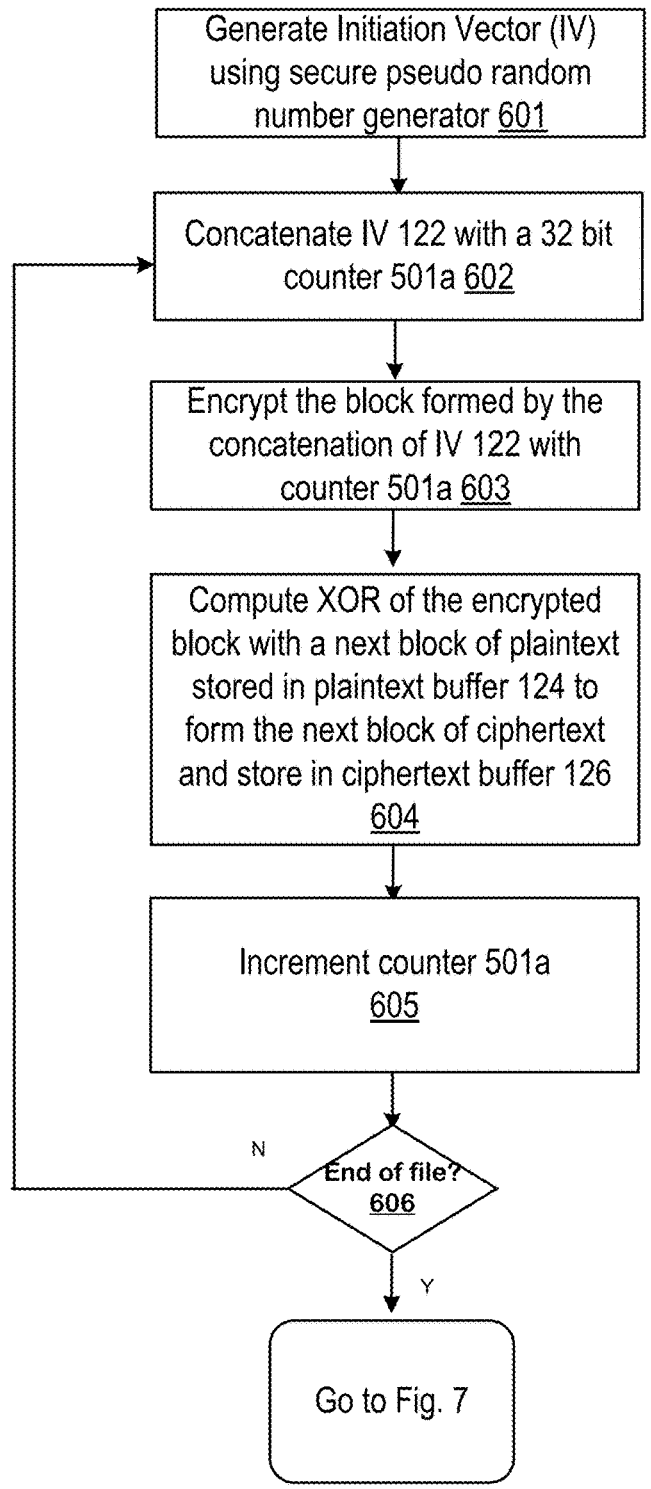
FIG. 6 is a flowchart illustrating a block cipher counter mode operation for a security command decoder as described herein for a system like that of FIGS. 1A and 1B.

Now with reference to FIG. 5 and FIG. 6. FIG. 5 is a dataflow diagram illustrating a block cipher counter mode of a security command decoder as described herein for a system like that of FIG. 1. FIG. 6 is a flowchart illustrating a block cipher counter mode operation for a security command decoder as described herein for a system like that of FIG. 1.

In a block 601, an IV 122 is generated using a secure pseudo random number generator. In an implementation, the IV 122 is of size 96 bits (or 12 bytes) in length. The IV must be known only to the sender and the receiver.

In block 602, the IV 122 is then concatenated with a 32 bit counter 501a. In one implementation, counter 501a starts counting from zero. In another implementation, counter 501a starts counting from one. The counter starts from zero in implementations using counter mode for encrypting the plaintext. The concatenated string block is of size 128 bits and can now be encrypted.

In block 603, the block formed by the concatenation of IV 122 with counter 501a is encrypted with authenticated encryption standard using key 116. This results into a string s of size 16 bytes or 128 bits.

In block 604, the resultant string s is XORed with the first block of plaintext stored in plaintext buffer 124 to get the first block of ciphertext and stored in ciphertext buffer 126.

In block 605, the value of counter is then increased by one.

In block 606, steps 601 to 605 are repeated for each value of counter and different plaintext blocks in plaintext buffer 124, forming ciphertext to store in ciphertext buffer 126.

In one implementation, for the last block of plaintext, if the plaintext block is not a multiple of 16 (i.e., the blocksize), the resulting encrypted ciphertext string s will be sliced to a length equal to the length of last block of plaintext and then XORed with the last block of plaintext.

Having described how encryption/decryption circuitry 114 can encrypt plaintext to form ciphertext, a process for ensuring the integrity of the data with will be described with renewed reference to data flow diagram 500 of FIG. 5 and with reference to flowchart 700 of FIG. 7.

One implementation of a process for generating an Authentication Tag 98 is based upon an Encrypt-then-MAC construction and Wegman-Carter MAC. The function used for generating Authentication Tag is also known as GHASH( ). The function GHASH is defined by GHASH(H, A, C)=Xm+n+1, where the inputs A and C are associated data 118 and ciphertext 126, respectively, formatted as described above, and the variables Xi for i=0, . . . , m+n+1 are defined by equation (2):

$$X_i = \begin{cases} 0 & \text{for } i = 0 \\ (X_{i-1} \oplus A_i) \cdot H & \text{for } i = 1, \ldots, m-1 \\ (X_{m-1} \oplus (A_m^* \| 0^{128-v})) \cdot H & \text{for } i = m \\ (X_{i-1} \oplus C_i) \cdot H & \text{for } i = m+1, \ldots, m+n-1 \\ (X_{m+n-1} \oplus (C_m^* \| 0^{128-u})) \cdot H & \text{for } i = m+n \\ (X_{m+n} \oplus (len(A) \| len(C))) \cdot H & \text{for } i = m+n+1 \end{cases} \quad (2)$$

Figure 7:
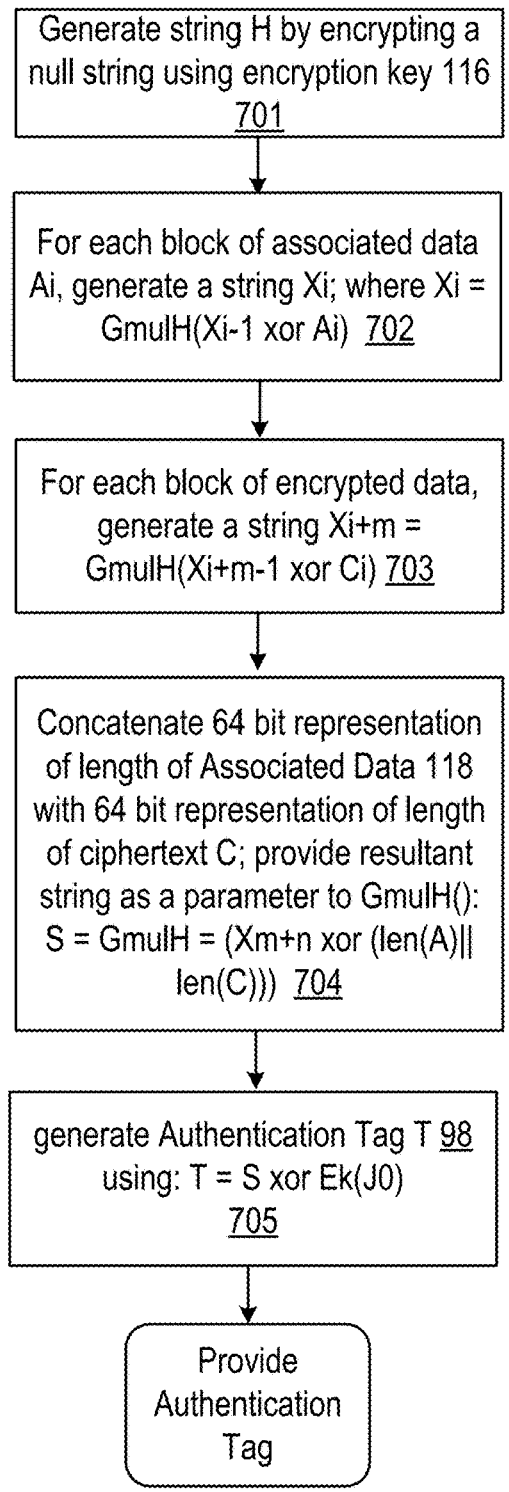
FIG. 7 is a flowchart illustrating a process for generating an authentication tag to verify the integrity of data using block cipher counter mode operation as described herein for a system like that of FIGS. 1A and 1B.

Now with reference to FIG. 5 and FIG. 7. FIG. 5 is a dataflow diagram illustrating a block cipher counter mode of a security command decoder as described herein for a system like that of FIG. 1. FIG. 7 is a flowchart illustrating a process for generating an authentication tag to verify the integrity of data using block cipher counter mode operation as described herein for a system like that of FIG. 1.

In block 701, the secret string H is generated by encrypting a null string using encryption key 116, i.e., H=Ek ("\x00"*16); wherein "\x00"*16 is a null string of size 16 bytes.

In block 702, the Authentication Tag is generated in a series of steps, block wise. Hence, for each block of associated data 118, Ai, a string Xi is generated by circuit 504 using the following computation, and this contributes to the final authentication tag: Xi=GmulH(Xi−1 xor Ai), for i=1, . . . , m, X0=0. Here m is the number of blocks to be authenticated only (Associated Data blocks).

In block 703, now that associated data blocks Ai have been included in the authentication tag, the current authentication tag will be processed by circuit 504 and n ciphertext blocks 126a, 126b will also be included in the authentication tag: Xi+m=GmulH(Xi+m−1 xor Ci), for i=1, . . . , n. Here n is the number of blocks of ciphertext.

In block 704, the 64 bit representation of length of Associated Data A is concatenated with 64 bit representation of length of ciphertext C. The resultant string is supplied as a parameter to GmulH( ) as follows: S=GmulH=(Xm+n xor (len(A)∥len(C)))

In block 705, generate Authentication Tag T 98 using: T=S xor Ek(J0); wherein J0 is formed by the concatenation of initiation vector 122 and counter0 501a.

In one implementation, authentication tag 98 can be generated in parallel with generation of each block of ciphertext from the encryption function.

In block 705, the service returns concatenation of ciphertext C and corresponding authentication tag T as the final output.

Figure 8:
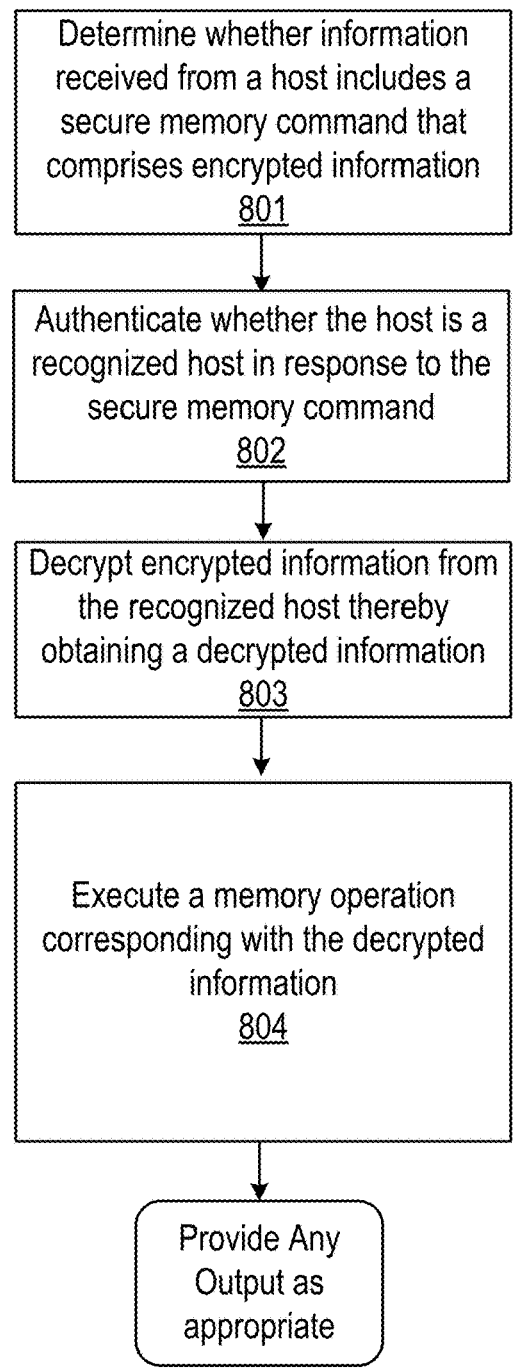
FIG. 8 is a flowchart illustrating a process for operating a memory device for executing secured commands as described herein for a system like that of FIGS. 1A and 1B.

FIG. 8 is a flowchart illustrating a process for operating a memory device for executing secured commands as described herein for a system like that of FIG. 1. The memory device typically includes an encryption/decryption logic circuitry and an input/output interface.

In block 801, the memory device determines whether information received from a host includes a secure memory command that comprises encrypted information.

In block 802, the memory device authenticates whether the host is a recognized host in response to the secure memory command.

In block 803, the memory device decrypt encrypted information from the recognized host thereby obtaining a decrypted information.

In block 804, the memory device executes a memory operation corresponding with the decrypted information.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

A byte is a basic storage unit used in many integrated circuit logic and memory circuits, and consists of eight bits. Basic storage unit can have other sizes, including for example one bit, two bits, four bits, 16 bits and so on. Thus, the description of a encryption/decryption logic circuitry set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four bit storage units combined with eight bit storage units.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the described technology, and it will be understood that numerous additional steps for accomplishing other functions can be performed before, after and between those shown.

A device having a controller, and a method responsive to a command sequence including a secured command, are described herein.

A device having a controller, and a method responsive to a command sequence including an unsecured command, are described herein.

A device having a controller, and a method responsive to a command sequence including a secured command further including an encrypted immediate data payload, are described herein.

A device having a controller, and a method for executing a secured command including encrypted command parameters, are described, including detecting a secured command carrying an immediate data payload, authenticating whether the host is a recognized host in response to the secure memory command, decrypting encrypted information from the recognized host thereby obtaining a decrypted information, and executing a memory operation corresponding with the decrypted information.

A device having a controller and a method are described, including a secured command further including an encrypted immediate data payload, the immediate data payload can be decrypted into a memory access command that can be executed upon a memory array; thereby eliminating a possibility of a third party interfering or intercepting the memory access command.

A device having a controller, and a method, are described including a secured command further including an encrypted immediate data payload; the payload will have command information that when executed will perform a memory operation.

A device having a controller, and a method, are described including a secured command further including an encrypted immediate data payload; the payload will have command information which will be executed, in which the command information is issued on a memory array.

A device having a controller, and a method, are described including a secured command further including an encrypted immediate data payload; the payload will have command information which will be executed on a memory array, in which the command is only issued when the secured command is authenticated.

A device having a controller and a method are described responsive to a secured command including an encrypted immediate data payload perform memory access operations.

A device having a controller and a method are described for including a secured command further including an encrypted immediate data payload, a first stage decrypt process and a second stage decode process with buffering using first and second stages.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
a memory array including a plurality of bit lines;
an input/output interface for I/O data units;
data path circuits connected between the memory array and the input/output interface;
a command decoder circuit responsive to commands received at the input/output interface, to decode command information received from a host including a secure memory command that comprises encrypted information including at least one secured command having an encrypted memory access command op code; and
security logic circuitry that authenticates whether the host is a recognized host in response to the secure memory command, decrypts encrypted information including the secured command having an encrypted memory access command op code from the recognized host thereby obtaining a decrypted information, and executes a memory operation corresponding with the decrypted information.

2. The device of claim 1, further comprising:
the command decoder circuit receiving a command sequence including: a command code field and an intermediate data payload, wherein:
the command code field includes an op code indicating one of (i) an unencrypted command; and (ii) a secured command in which the intermediate data payload includes an encrypted memory access command op code, an encrypted address field indicating a location or locations from which data is to be read, and one or more encrypted input variables including an encrypt result indicator.

3. The device of claim 2, further comprising:
the security logic circuitry having encrypt/decrypt circuits that encrypt data read from memory resulting from reading data when the op code indicates a secured command, the encrypted memory access command op code indicates a read from memory, and encrypt result indicator of the one or more encrypted input variables indicates encrypting the result.

4. The device of claim 1, further comprising:
the command decoder circuit receiving a command sequence including: a command code field and an intermediate data payload, wherein:
the command code field includes an op code indicating one of (i) an unencrypted command; and (ii) a secured command in which the intermediate data payload includes an encrypted memory access command op code, an encrypted address field indicating a location or locations to which data is to be written, encrypted data, and one or more encrypted input variables including an encrypt result indicator.

5. The device of claim 4, further comprising:
the security logic circuitry having encrypt/decrypt circuits that encrypt a return code resulting from writing data when the op code indicates a secured command, the encrypted memory access command op code indicates a write to memory, and encrypt result indicator of the one or more encrypted input variables indicates encrypting the result.

6. The device of claim 1, further comprising:
the command decoder decoding an unencrypted command.

7. The device of claim 1, wherein the security logic circuitry provides a result of the memory operation executed in unencrypted form.

8. The device of claim 7, wherein the security logic circuitry computes a message authentication code based upon the result of the memory operation executed and provides the result in unencrypted form along with the message authentication code.

9. The device of claim 1, wherein the security logic circuitry computes an authentication code based upon encrypting the result of the memory operation executed and provides the result in encrypted form along with the authentication code.

10. The device of claim 9, wherein the security logic circuitry encrypts the result of the memory operation executed using a block counter mode cipher to encrypt blocks of the result to form blocks of ciphertext information; and concatenates at least two blocks of ciphertext information together in a buffer register.

11. The device of claim 10, wherein the security logic circuitry encrypts the result of the memory operation executed using a block counter mode cipher by encrypting blocks of an initialization vector concatenated with a counter using a symmetric key shared with an intended recipient to obtain an intermediate result, and computes an exclusive OR of the intermediate result with corresponding blocks of plaintext to form blocks of ciphertext information.

12. The device of claim 1, wherein the security logic circuitry decrypts encrypted information from the recognized host using a block counter mode cipher to decrypt blocks of the encrypted information to form blocks of plaintext information; and concatenates at least two blocks of plaintext information together in a buffer register.

13. A method for operating a memory device for executing secured commands, the device including an encryption/decryption logic circuitry and an input/output interface, comprising:
determining whether information received from a host includes a secure memory command that comprises encrypted information including at least one encrypted op code;
authenticating whether the host is a recognized host in response to the secure memory command;
decrypting encrypted information including at least one encrypted op code from the recognized host thereby obtaining a decrypted information; and
executing a memory operation corresponding with the decrypted information.

14. The method of claim 13, further comprising computing a message authentication code based upon the result of the memory operation executed; and providing the result in unencrypted form along with the message authentication code.

15. The method of claim 13, further comprising computing an authentication code based upon encrypting the result of the memory operation executed; and providing the result in encrypted form along with the authentication code.

16. The method of claim 15, wherein encrypting the result of the memory operation executed further includes using a block counter mode cipher to encrypt blocks of the result to form blocks of ciphertext information; and concatenating at least two blocks of ciphertext information together in a buffer register.

17. The method of claim 16, wherein encrypting the result of the memory operation executed using a block counter mode cipher further includes encrypting blocks of an initialization vector concatenated with a counter using a symmetric key shared with an intended recipient to obtain an intermediate result, and computing an exclusive OR of the intermediate result with corresponding blocks of plaintext to form blocks of ciphertext information.

18. The method of claim 13, wherein decrypting encrypted information from the recognized host further includes using a block counter mode cipher to decrypt blocks of the encrypted information to form blocks of plaintext information; and concatenates at least two blocks of plaintext information together in a buffer register.

19. A memory device, comprising:
a memory array including a plurality of bit lines;
an input/output interface for I/O data units;
data path circuits connected between the memory array and the input/output interface;
a command decoder circuit receiving secured and unsecured commands at the input/output interface, the decoder having security logic circuitry that decrypts encrypted immediate data payload when a secured command having an encrypted op code is received, thereby obtaining a decrypted information including the op code as decrypted, and executes a memory operation corresponding with the decrypted information.

20. The memory device of claim 19, further comprising:
security logic circuitry authenticates whether the host is a recognized host in response to an input tag received with the secure command op code.

\* \* \* \* \*